United States Patent
Burkholder et al.

(10) Patent No.: US 6,450,892 B1
(45) Date of Patent: Sep. 17, 2002

(54) BOWLING LANE RESTORATION AND SHIELDING SHEET AND METHOD OF ASSEMBLY

(75) Inventors: Roy A. Burkholder, Whitehall; Raymond R. Fineran, Jr., North Muskegon, both of MI (US); Jan Hansen, Kungsbacka (SE)

(73) Assignee: Brunswick Bowling & Billiards Corporation, Muskegon, MI (US)

( * ) Notice: Subject to any disclaimer, the term of this patent is extended or adjusted under 35 U.S.C. 154(b) by 0 days.

(21) Appl. No.: 09/575,950

(22) Filed: May 23, 2000

Related U.S. Application Data (63) Continuation-in-part of application No. 09/060,914, filed on Apr. 15, 1998, now abandoned.

(51) Int. Cl.$^7$ ................................................. A63D 1/04
(52) U.S. Cl. ....................................... 473/115; 473/117
(58) Field of Search ............................... 473/115, 117; 52/408, 41; 156/71, 94, 152, 306.6, 389, 574, 577

(56) References Cited

U.S. PATENT DOCUMENTS

| | | |
|---|---|---|
| 4,139,671 A | * 2/1979 | Kelly et al. |
| 4,244,570 A | 1/1981 | Murrey, Sr. |
| 4,406,456 A | 9/1983 | Berry et al. |
| 4,795,152 A | 1/1989 | Suiter |
| 4,867,816 A | 9/1989 | Suiter |
| 4,944,514 A | 7/1990 | Suiter |
| 5,348,513 A | 9/1994 | Heddon |
| 5,472,381 A | 12/1995 | Ayre, Jr. |
| 5,489,241 A | 2/1996 | Perrier |
| 5,529,541 A | 6/1996 | Perrier |
| 5,549,516 A | 8/1996 | Heddon |
| RE35,778 E | 4/1998 | Stirling et al. |

\* cited by examiner

*Primary Examiner*—William M. Pierce
(74) *Attorney, Agent, or Firm*—Price, Heneveld, Cooper, DeWitt & Litton (57) ABSTRACT

A bowling lane having a substantially flat top surface including a foul line end and a pin deck end, the improvement comprising a method and assembly of a polymer sheet of polycarbonate having a thickness between about 0.63 and 2.50 mm, overlaid onto the top surface between the foul line end and pin deck rear end and having a leading edge portion and a trailing edge portion, a strip of double-sided adhesive tape beneath the leading edge portion for securing to the foul line end, and double-sided tape beneath the trailing edge portion for securing it at the pin deck end. Any other mechanical fastening system may also be used to adhere the sheet to the lane. The polymer sheet may be 100% polycarbonate, but may also include a first layer that optionally comprises a lubricious polymeric material such as Teflon® in combination with polycarbonate. The polymer sheet undersurface is free of adhesive. A similar sheet, preferably of slightly greater thickness, is preferably applied to the approach and adhered at the front and rear edge portions by strips of double-sided tape across the width of the approach. A similar sheet may also be applied to the pin deck area.

62 Claims, 2 Drawing Sheets

BOWLING LANE RESTORATION AND SHIELDING SHEET AND METHOD OF ASSEMBLY

CROSS-REFERENCE TO RELATED APPLICATION

This application is a continuation-in-part of U.S. patent application Ser. No. 09/060,914, entitled "BOWLING LANE RESTORATION AND SHIELDING PANEL AND ASSEMBLY," filed on Apr. 15, 1998 by Jan Hansen, now abandoned. Priority under 35 U.S.C. §120 is hereby claimed on the above-identified patent application. The entire disclosure of U.S. patent application Ser. No. 09/060,914 is incorporated herein by reference.

BACKGROUND OF THE INVENTION

This invention relates to ten pin bowling lanes and other indoor bowling lanes such as five pin and duck pin bowling lanes. It is especially useful for a reconstructed bowling lane surface, in a method of preparing a bowling lane surface, and as a bowling lane surface protecting material over wood or synthetic lanes.

Bowling lane assemblies are composed of an elongated lane, a wider approach section at the foul line end, and a pin deck on the pin deck end. These lanes are primarily of two main types. One type is formed of joined wood boards. The other type has a synthetic surface on a support base such as pressed wood. Both types are mounted on an elevating support structure.

After a period of use of the lane, the action of bowling balls on the lane surface and repeated refinishing of the surface creates wear and dents requiring resurfacing or reconstruction of the lane. A conventional way of treating the lane is to sand it down and apply a new finish coat to it. Another more recent technique for resurfacing bowling lanes is to cover the lane with a thin flexible tape or film 0.076 to 0.178 mm (3 to 7 mils) thickness and having an undersurface coated with adhesive, not totally unlike a giant roll of cellophane tape, as described in commonly-assigned U.S. Pat. Nos. 4,795,152 and 4,867,816.

This later technique has been found to be effective for many bowling establishments and has been widely used. However, it is not universally applicable, and it requires considerable skill and effort to avoid problems associated with the large underside adhesive surface area. The film must be carefully controlled as it is being unrolled and laid in order to minimize air pockets, misalignment, and other difficulties from an adhesive material of this nature. One specific difficulty, which arises when using this film, occurs due to seasonal movement in boards for wooden lanes. Because the material is adhered to the entire surface of the lane, the expansion and contraction of the wood boards can cause waves or tunneling of the film material resulting in a lane surface that is not smooth. Later removal of the film also destroys the film.

Additionally, the film material is thin and does not prevent the wood underneath from being dented by the ball or pins. Abrasive material or sharp pieces on the ball may penetrate the thin film. The ball can also penetrate the film used in this technique if the film is not cared for properly. The film lasts only 3–10 years.

Rigid synthetic lane panels are also sometimes used to reconstruct lane surfaces. However, this is extremely expensive and leaves joints between the panels. The panels are usually about ½ inch and 12 feet long phenolic or phenolic and pressed wood panels.

It would be advantageous to be able to protect new lanes from the need to recondition them, or, if worn, to protect them against further wear, and thereby extend their useful life indefinitely.

SUMMARY OF THE INVENTION

The novel method, materials, and combination protects new or reconditioned lanes from wear. It also avoids difficulties associated with the above-mentioned previously patented development.

An aspect of this invention is to provide a unique method, sheet material, and resulting lane construction that can be readily manufactured in extruded form, can be readily installed, neither utilizes nor requires adhesive spread over the undersurface of the material, is readily removed and replaced, if necessary, at a later date. Typically, but not necessarily, the method employs small strips of double-sided tape or other adhesive means or any type of mechanical fastening system at select locations for installation and retention of position. It protects the lane, whether of wood or synthetic material, and extends the life of the lane. It can also be used to revamp damaged sections of a lane.

The method achieves resurfacing of a bowling lane, even the approach and pin deck area if desired, with a sheet of flexible, relatively thick, polymer having a thickness of about 0.63 to 2.50 mm (25–100 mils), uncoated with adhesive. The side edges of the lane-covering polymer sheet can be trimmed, and then the end edges trimmed, if necessary. Any initial waves in the laid extruded sheet have been found to basically disappear after being pushed down by a towel bar from the foul line to the pin deck. The polymer sheet may be one layer of clear 100% polycarbonate.

The extruded polymer sheet may also comprise a first layer and a second layer underlying the first layer. The first layer may be 100% polycarbonate or alternatively, may be a mixture of about 5–20% of a lubricious polymeric material, i.e., Teflon®, and correspondingly about 80–95% polycarbonate. When 100% polycarbonate is used, the total thickness of the first layer is about 25% of the total thickness of the extruded polymer sheet. When the first layer is made of polycarbonate and Teflon®, the first layer is about 5–50% of the total thickness of the extruded polymer sheet.

The first layer may contain an optical brightener, which may include a fluorescent dye that is responsive to ultraviolet light. The sheet may optionally include a third layer beneath the second layer. The optional second and third layers may contain a tinting dye or an ultraviolet blocking agent to avoid uneven glow appearance from substances beneath the film in the wood, etc. A replaceable decorative film, advertising material or web material of chosen design and colors may be placed beneath the applied polymeric sheet or printed on the surface, usually on the bottom, of the polymer sheet as well.

These and other features, advantages and objects of the present invention will be further understood and appreciated by those skilled in the art by reference to the following specification, claims and appended drawings.

DETAILED DESCRIPTION OF PREFERRED EMBODIMENTS

Figures 1, 2, 3:
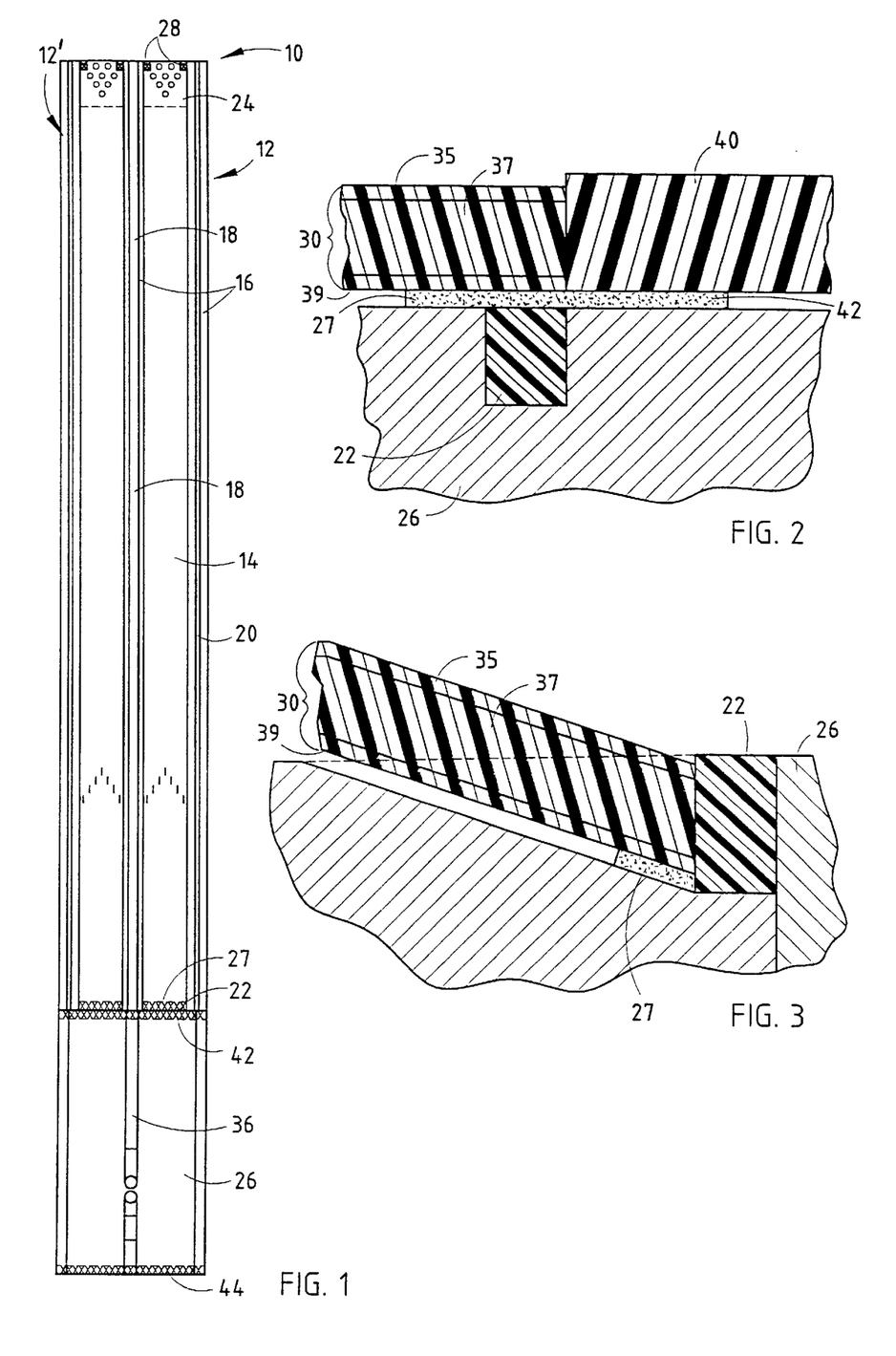
FIG. 1 is a plan view of a pair of bowling lanes, gutters, ball return zone, approaches and pin decks embodying the present invention.
FIG. 2 is a greatly enlarged, fragmentary, side elevational view of one embodiment of the juncture of the approach and the lane at the foul line.
FIG. 3 is a greatly enlarged, fragmentary, side elevational view of another embodiment of the juncture of the approach and the lane at the foul line.

Referring now to the drawings, a two lane bowling facility is shown to illustrate the invention, it being realized that typical bowling centers have a large number of lanes, usually in pairs like this. This two lane arrangement 10 includes the two lane assemblies 12 and 12' in a typical arrangement with each lane 14 being straddled by a pair of gutters 16. Between the two lane assemblies is a ball return capping 18, which is above a ball return channel of typical type. At the opposite sides of the two lanes from the ball return capping are lane divisions 20 of typical type.

Each lane 14 is of standard length, i.e., 60 feet plus or minus ½ inch as measured from the foul line 22 to the center of the number one pin on the pin deck 24. At the head end of the lane, i.e., adjacent foul line 22, is what is known as the approach 26. The approach 26 is where the bowler advances toward the lane with the ball in hand in order to bowl the ball down the lane towards the pins on the pin deck 24. These pins are graphically illustrated as ten pins in the typical triangular configuration with number one pin being at the front apex of the triangle and numbers seven and ten pins being at the rear apices or corners of the triangle. The lane is of standard width of 41 ½ inches plus or minus one-half inch, according to the standards of the American Bowling Congress (ABC).

The present invention will sometimes be used to restore or recondition a lane which has become worn due to ball indentations, ball tracking marks, blemishes, pin indentations, and general wear due to repeated traverse of the lane by balls and by a conventional lane conditioner. Alternatively, the invention can be used to complete, i.e., finish off, a new lane of wood or of synthetic material. If the lane is a worn lane, it is preferably sanded to remove ball dents and other cosmetic problems before the sheet material of this invention is installed, and preferably, a wood lane has a slightly rubbery base coat lane finish applied to it to seal the wood, which prevents liquids from wicking between the sheet and lane. If the lane is in good condition, the sheet material of this invention can be installed on top of the existing wood lane finish or the synthetic lane. One variation is to sand and apply base coat only to the approximately first one-third of the lane from the approach since this is where most ball damage occurs. Then, the novel sheet material is applied to the lane. If it is later decided to recondition the entire length of the lane, the novel sheet material and lane protection layer can be readily removed from the lane, the lane reconditioned, and the novel sheet material replaced over the length of the lane.

In contrast to the prior teachings, wherein a very thin film, e.g., about 0.076 to 0.178 mm (3 to 7 mils), having an adhesive over its lower surface, is carefully unrolled and adhered over the length of the lane, the present sheet is of substantial thickness of about 0.63 to 2.50 mm, preferably 1.25 mm thick, and is not coated with adhesive. In the depicted embodiment of FIG. 1, the extruded polymer sheet 30, preferably made of polycarbonate, extends over the length of the lane from the foul line 22 to the rear edge of the pin deck 24. However, the extruded polymer sheet may cover the approach, the lane, and the pin deck or any one of these areas individually or in combination. One or more sheets may be used.

In the typical instance, the polymer sheet extends from the foul line 22 to the rear edge of the pin deck 24. The polymer sheet is not typically glued to the entire lane. Rather, the foul line end portion of the sheet is attached by an adhesive means or any type of mechanical adhesive means and the central area of the lane remains free of adhesive. Preferably, the adhesive is a narrow strip of thin, double-sided adhesive tape 27, preferably about 0.1 mm thickness, extends substantially the width of the lane, and is positioned between extruded polymer sheet 30 and the lane surface, i.e., beneath the sheet and on top of the lane surface. The sheet 30 is preferably relatively stiff when flat. This leading edge is what primarily holds the sheet in position. However, static forces also assist in retaining the sheet in position, especially over the central area of the lane. At the far end of the lane, i.e., at the rear of pin deck 24, the polymer sheet 30 may be secured to the underlying lane surface by a pair of laterally spaced strips of thin double-sided adhesive tape 28 (FIG. 1). It is presently preferred to have these strips of tape basically at the corners, i.e., adjacent the number seven and number ten pin locations. The double-sided tape 27 at the foul line is preferably about two inches wide. The double-sided tape at 28 preferably is in pieces of about two inches wide by four inches long in dimension, both being very thin, preferably about 0.1 mm thickness. The polymer sheet may be a substantially clear sheet made of 100% polycarbonate.

In another embodiment, the extruded polymer sheet 30 may also comprise a first layer 35 and a second layer 37 underlying first layer 35. First and second layers 35 and 37 are preferably co-extruded. The extruded polymer sheet is clear, i.e., transparent when polycarbonate is used to form the extruded polymer sheet. The extruded polymer sheet may be provided with selected decorative effects underneath it. These decorative materials can be inserted as a film or web and removed at will since the polymer sheet is not glued to the lane over its length. The decorative effects or advertising material may also be printed on the polymer sheet. Thus, for example, the undersurface material can have a simulated wood appearance, advertising material, or any suitable design or wording to suit special occasions or environments. The second layer 37 can include in its thickness a coloring agent, an ultraviolet light blocker material, and/or an ultraviolet responsive pigment or dye material that is responsive to ultraviolet light to provide a special glow-in-the dark effect similar to that described in U.S. Pat. Nos. 5,489,241, 5,529,541, and 5,888,142, the disclosures of which are incorporated herein by reference. Incorporation of the ultraviolet responsive material into the second layer is advantageous because, should scratches occur in the first layer, this will not adversely affect the ultraviolet lighting characteristics of the lanes. Nevertheless, the ultraviolet responsive material could alternatively be incorporated in the first layer.

The first layer 35 may comprise between about 5–20% of a lubricious polymeric material, i.e. Teflon® (tetrafluoroethylene fluorocarbon, fluorinated ethylene-propylene, or copolymers thereof) and correspondingly 80–95% polycarbonate instead of being 100% polycarbonate material. When this is done, the thickness of the first polycarbonate layer is about 5–50% of the total thickness of the extruded polymer sheet. An extruded layer of Teflon®/polycarbonate can be made by feeding beads, which are each made of 5–20% Teflon® and correspondingly 80–95% polycarbonate into the extruder.

According to another embodiment, the extruded polymer sheet is composed of three laminated layers underlying one another including, a first polycarbonate layer, which is clear and may optionally include a lubricious polymeric material such as Teflon® and/or an optical brightener, a second polycarbonate layer that is clear and contains an ultraviolet responsive pigment or dye, a color tint material, and an ultraviolet light blocker material, and a third polycarbonate layer, which also is clear. The third layer may contain an ultraviolet light-blocking agent to protect the lane from fading, a color tint material, an optical brightening material, and/or an ultraviolet light blocker alone or in any combination. Preferably, the first, second, and third layers are co-extruded. Due to the co-extrusion, the first, second, and third layers do not necessarily form discrete layers.

The use of Teflon® in combination with polycarbonate in the first layer of the extruded polymer sheet reduces friction on the lane and creates a slight white color. When Teflon® is added to the first layer, however, the coefficient of friction of the upper surface of the sheet material is comparable to that of an oiled lane surface. The slight white color of the Teflon®/polycarbonate first layer is an advantage because it brightens the bowling lane under normal lighting conditions. Bowlers find bright lanes more appealing. The Teflon®/polycarbonate first layer also typically creates a bowling surface with better texture. When the Teflon® is incorporated into the first or only layer, the extruded polymer layer is less glossy and has a generally matte appearance, making a matte finish treatment unnecessary. When Teflon® is incorporated into the first layer, except for the relative thickness changes discussed above, the composition of the second and third polycarbonate layers, when used, remain as discussed above. Whether or not Teflon® is used as a component in the first layer, the first or second polycarbonate layers may contain ultraviolet responsive pigments or dyes. The ultraviolet responsive pigment or dye may be a fluorescent glow-in-the-dark material that may have a slightly brown appearance under normal lighting conditions or it may be clear with no visible coloration under normal lighting conditions. Of course, any combination of glow-in-the-dark ultraviolet responsive pigments or dyes may be used or the pigment or dye may be omitted entirely from the second polycarbonate layer in both embodiments. Likewise, as discussed above, the third layer may contain an ultraviolet light blocker, which protects the wood surface of the lane from becoming damaged.

As discussed previously, the polymer sheet may be substantially clear 100% polycarbonate only. The approach 26 may or may not have a polymer sheet 40 applied. If it is applied, preferably the sheet 40 (FIG. 2) on the approach will be at least as thick and preferably slightly thicker than sheet 30 on the lane so as not to interfere with the sliding action of the bowler. For example, if the sheet 30 is 1.25 mm thick, sheet 40 is preferably between 1.5 to 2.0 mm thick up to the foul line 22 (FIG. 2). Since this approach cover sheet is traversed by the bowler who also slides on it, it has its forward edge adjacent the foul line secured by a thin layer 42 of adhesive or double-sided adhesive tape extending across the entire width of the approach layer 40, and at the rear edge of the approach, a layer 44 of thin, double-sided adhesive tape extends the width of the approach. The double-sided tape at 42 and 44 is very thin, about 0.1 mm thickness, and preferably about 2–3 inches wide. The double-sided adhesive tape contains a removable protective strip 29 over the adhesive on one side of the tape prior to attachment. Optionally, a fill-in strip 36 of polymeric material can be utilized between the approach sheets 40 of the adjacent lanes (FIG. 1).

The sheet 30 is formed of an extruded polymer. Preferably, a removable protective film is applied to at least one surface of the polymer sheet after the polymer is extruded. Polymer sheet 40 is formed in the same way. The polymer sheets are extruded to ultimately lie flat. The polymer sheet is then transported in a roll to the bowling establishment.

When installing the sheet material on the bowling lane, a roll of polymer sheet is typically used. Once the lane has been prepared, if necessary, by sanding and base coat finishing the existing lane surface, the roll of polymer sheet 30 is laid down on the bowling lane and unrolled over the area to be covered. Once unrolled, the protective film/layer may be removed from extruded polymer sheet 30 prior to installation. Unrolling the sheet and/or removing the protective film creates a static charge that attracts particles to the bottom surface of sheet 30. Typically, any remaining dust or other small particles on the lane surface adhere to the sheet due to the static forces. If this occurs, the sheet may be inverted (flipped over). This exposes the particles attached to the polymer sheet by the static forces such that they may be removed with a towel.

In order to easily flip the polymer sheet, the pin deck end of the polymer sheet is pulled over the polymer sheet until it lies on the approach. Then, the looped end is grasped and pulled onto the approach. There are now four polymer sheet sections overlying one another. Next, the bottom layer of the polymer sheet is pulled out from the looped end (now located about 15 feet down the lane). When the installer approaches the pin deck end, the polymer sheet will flop over itself. The material may then be positioned as needed.

If the sheet material is not used on the approach area, then the leading edge of the sheet material at the foul line is laid after the underlying wood is beveled, e.g., about 1.5 mm deep at the foul line, for a sheet material of 1.25 mm thickness, angling up to the rest of the lane surface in a six inch distance or so as depicted in FIG. 3. This is to assure that polymer sheet 30 will not extend above the level of the approach so as to inhibit the bowler's sliding action in the event the bowler slides across the foul line. The sheet is then slid, as necessary, until one end is adjacent the foul line and the opposite end is at the far end of the pin deck. The top surface is preferably then cleaned with a slightly damp lint-free towel bar or the like. This removes any dirt and dust from the polymeric sheet and should especially be done if the sheet has been inverted to expose dust or other particles that were on the lane, but that adhered to the sheet due to static forces, as discussed above.

Once the polymer sheet is positioned so that it is straight and covers the entire lane surface, it can be temporarily attached to the lane with the few pieces of double-sided tape. It may be permanently attached. Then, a cutting tool of the type commonly used for cutting polymers, is preferably employed to trim the side edges of the polymer sheet so that the width of the sheet is equal to or slightly less than the underlying lane width. Preferably, the edges are about 0.1 mm or so less width than the lane, on each side of the lane but within the ABC guidelines. Then the front and back ends are trimmed to the proper length, if necessary. Preferably, the top surface of the sheet material is then buffed slightly as with a rotary floor machine, at least for the first approximately 30–45 feet of the lane. The cut edges are then smoothed and typically beveled.

After the surface of the extruded polymer sheet is cleaned as necessary, it is attached at the foul line with the double-sided tape 27 about two inches wide and about 0.1 mm thickness over the width of the material. Two pieces of two inch wide tape may also be used. For ease of installation, the double-sided tape should be attached to the lane first. It may be desired not to further secure the rear end of the polymer sheet at the pin deck until the lane has been used and/or conditioned with a common bowling lane conditioner a few times to assure that it lies completely flat. Ultimately, the rear end of the polymer sheet is preferably attached to the underlying lane surface by a pair of approximately two inch by four inch pieces of double-sided tape 28 at the rear corners of the pin deck. The sheet material can be buffed periodically to assure uniformity of surface characteristics. With these simple steps completed, the sheet material has been found by extensive testing to be suitable for extended bowling.

The polymer sheet surface can be smooth or have a matte finish. As discussed above, when no Teflon® is incorporated into the polycarbonate layer, treatment may be necessary to obtain a matte finish, while no such treatment is necessary when Teflon® is used because the reconditioning layer is less glossy. If at any time it is desired to remove the polymer sheet for treatment of the lane in any fashion, or applying decorative surfaces or the like beneath it, this can be readily done by simply releasing the double-sided tape at the ends and shifting the polymer sheet off the lane.

Installation of extruded polymer sheet 40 on the approach is done in similar fashion except that the entire width of the sheet 40 on the approach has the double-sided tape 42 on both the edge portion adjacent the foul line and at 44 on the leading edge portion as depicted in FIG. 1.

Figure 4:
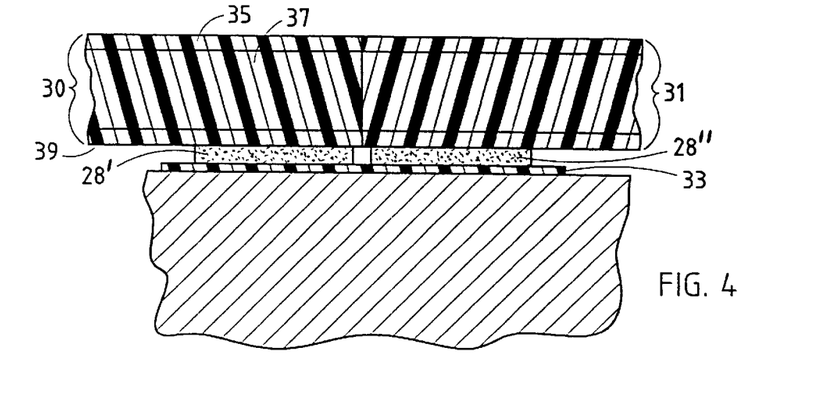
FIG. 4 is a greatly enlarged, fragmentary side elevational view of an embodiment of the juncture at the lane and the pin deck.
Figure 5:
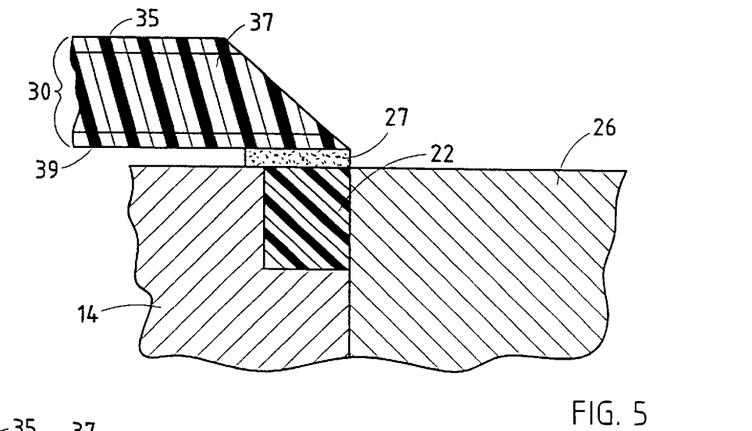
FIG. 5 is a greatly enlarged, fragmentary, side elevational view of an embodiment showing the extruded sheet on a synthetic lane and without applying an extruded sheet on the approach.
Figure 6:
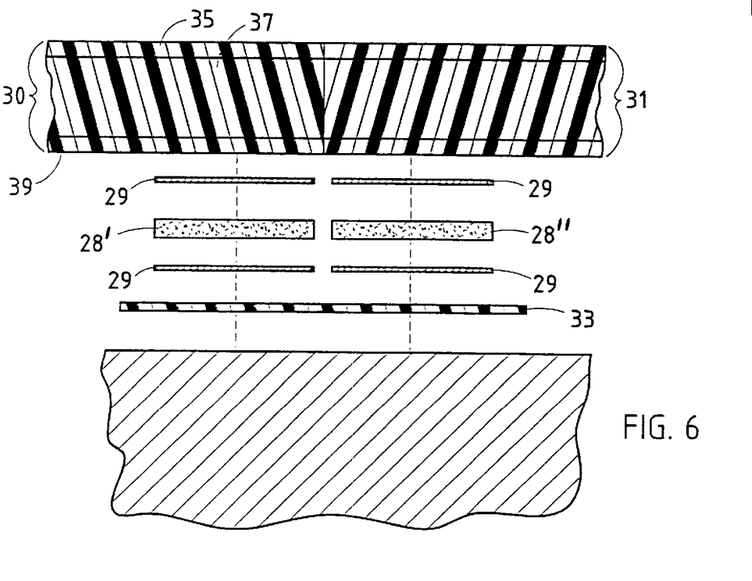
FIG. 6 is a greatly enlarged, exploded, side elevational view of an embodiment of the juncture at the lane and the pin deck.

If it is desired to have a separate layer of sheet material on the pin deck 24, this can be done in a manner indicated in FIG. 4 by having polymer sheet 30 terminate at the front of the pin deck, applying a separate polymer sheet 31 on the pin deck, there being underlying double-sided tape 28' beneath the rear edge of polymer sheet 30, and tape 28" beneath the forward edge of polymer sheet 31, adjacent to each other, and a very thin layer of clear plastic film 33, e.g., about 0.005 inch thickness, beneath both of these strips of tape. The tape may have an adhesive protective strip 29 on both sides (FIG. 6). However, typically the adhesive tape has a single top protective strip and the adhesive is rolled onto the surface when applied. Once unrolled, the top protective strip 29 is removed to reveal the adhesive. Additionally, if there is another section of the lane, e.g., the head section, which is damaged, it can be cut out and replaced with the sheet material of appropriate length. A separate piece of a very thin clear plastic, with adhesive on one side, may also be used to adhere the sheet to the lane, as disclosed in U.S. Pat. No. 4,795,152.

Also, a lubricious polymeric material containing lane finishing material may be applied as a lane finish directly to any portion of the surface of the lane, the pin deck, or to the polymer sheet.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. In a bowling lane of the type having an upper lane surface adapted to roll a bowling ball thereon, and including an approach end, a pin deck end, and opposite sides, the improvement comprising:

a single, continuous polymer sheet having a thickness of between about 0.63 and 2.50 mm, and a generally rectangular plan shape defined by a leading end, a trailing end, a central portion extending between said leading and trailing ends, and opposite side edges, and including an attachment strip area on the lower face of said polymer sheet, which attachment strip area extends laterally across the width of said polymer sheet adjacent the leading end thereof, said polymer sheet being positioned over said bowling lane such that the opposite side edges of said polymer sheet are disposed adjacent to the sides of said lane surface, the leading end of said polymer sheet is disposed adjacent to the approach end of said lane surface, and the trailing end of said polymer sheet is disposed adjacent to the pin deck end of said lane surface, and wherein the leading end of said polymer sheet is connected with said lane surface by securely mounting said attachment strip area to said lane surface to prevent inadvertent lateral and longitudinal movement therebetween, the trailing end of said polymer sheet is connected to said lane surface to prevent inadvertent lateral movement therebetween, and the central portion of said polymer sheet is unattached to said lane surface, so that said lane surface can shift both laterally and longitudinally without distorting the shape of said polymer sheet.

2. The bowling lane of claim 1 further comprising
a strip of double-sided adhesive tape on said attachment strip area.

3. The bowling lane of claim 2, wherein said polymer sheet is removed by detachment of said double-sided adhesive tape.

4. The bowling lane of claim 1, wherein said polymer sheet comprises a lubricious polymeric material and polycarbonate.

5. The bowling lane of claim 4, wherein said polymer sheet comprises a mixture of lubricious polymeric material and polycarbonate.

6. The bowling lane of claim 4, wherein said polymer sheet comprises a mixture of about 5–20% lubricious polymeric material and correspondingly about 80–95% polycarbonate.

7. The bowling lane of claim 1, wherein said polymer sheet comprises a first layer and a second layer underlying said first layer, said first layer comprising a lubricious polymeric material and polycarbonate.

8. The bowling lane of claim 7, wherein said polymer sheet further comprises a third layer comprising polycarbonate and any one or a combination of the following components:

1) a color tint material;
2) an optical brightener; and
3) an ultraviolet light blocker.

9. The bowling lane of claim 7, wherein said polymer sheet further includes a third layer underlying said second layer.

10. The bowling lane of claim 9, wherein at least one of said layers comprises an ultraviolet responsive fluorescent dye or pigment.

11. The bowling lane of claim 7, wherein said second layer comprises polycarbonate.

12. The bowling lane of claim 7, wherein said second layer comprises polycarbonate and an ultraviolet blocking agent.

13. The bowling lane of claim 1, wherein said polymer sheet comprises a first layer and a second layer underlying said first layer, said first layer comprising a optical brightner and polycarbonate.

14. The bowling lane of claim 13, wherein said polymer sheet further comprises a third layer comprising polycarbonate and any one or any combination of two or more of the following components:
   1) a color tint material;
   2) an optical brightener; and
   3) an ultraviolet light blocker.

15. The bowling lane of claim 1, wherein said polymer sheet comprises a first layer and a second layer underlying said first layer, said second layer comprising polycarbonate and any one or a combination of the following components:
   1) a color tinting material; and
   2) an ultraviolet light blocker.

16. The bowling lane of claim 15, wherein said polymer sheet further comprises a third layer comprising polycarbonate and any one or any combination of two or more of the following components:
   1) a color tint material;
   2) an optical brightener; and
   3) an ultraviolet light blocker.

17. The bowling lane of claim 1, wherein said polymer sheet comprises a first layer and a second layer underlying said first layer wherein said first layer comprises polycarbonate, a lubricious polymeric material, and an optical brightening material.

18. The bowling lane of claim 17, wherein said polymer sheet further comprises a third layer comprising polycarbonate and any one or any combination of two or more of the following components:
   1) a color tint material;
   2) an optical brightener; and
   3) an ultraviolet light blocker.

19. The bowling lane of claim 1, wherein said polymer sheet has a width equal to or slightly less than the width of said lane.

20. The bowling lane of claim 1, further comprising an approach, wherein said approach and said pin deck at opposite ends of said lane, said polymer sheet extending over said pin deck and secured using spaced strips of double-sided adhesive tape.

21. The bowling lane of claim 1, further comprising an approach, wherein said approach and said pin deck at opposite ends of said lane, said polymer sheet extending over said pin deck and said approach and secured using spaced strips of double-sided adhesive tape.

22. The bowling lane of claim 1, further comprising an approach adjacent said approach end and, a second polymer sheet, wherein said first polymer sheet extends over said lane and said second polymer sheet extends over said approach.

23. The bowling lane of claim 1, further comprising a pin deck area adjacent said pin deck end and a second polymer sheet wherein said first polymer sheet extends over said lane and said second polymer sheet extends over said pin deck area.

24. The bowling lane of claim 1, wherein:
said polymer sheet includes decorative materials.

25. The bowling lane of claim 24, wherein:
said decorative materials are formed at least in part with an ultraviolet responsive pigment or dye material.

26. The bowling lane of claim 25, wherein:
said polymer sheet has a first layer which is generally transparent; and
said decorative materials are applied to a lower face of said first layer.

27. The bowling lane of claim 26, wherein:
said first layer includes polycarbonate and a lubricious polymeric material.

28. The bowling lane of claim 27, wherein:
said polymer sheet has a second layer underlying said first layer;
said second layer includes polycarbonate and any one or a combination of the following components:
   1) a color tint material; and
   2) an ultraviolet light blocker.

29. The bowling lane of claim 28, wherein:
said polymer sheet further comprises a third layer underlying said second layer, and comprising polycarbonate and any one or a combination of the following components:
   1) a color tint material;
   2) an optical brightener; and
   3) an ultraviolet light blocker.

30. The bowling lane of claim 29, wherein:
said decorative materials include at least some advertising materials.

31. The bowling lane of claim 1, wherein:
said polymer sheet includes an ultraviolet responsive pigment or dye material.

32. The bowling lane of claim 1, wherein:
said polymer sheet has a first layer which is generally transparent; and including:
   decorative materials are applied to a lower face of said first layer.

33. The bowling lane of claim 1, wherein:
said polymer sheet includes at least some advertising materials.

34. A method for surfacing a bowling lane of the type having an upper lane surface adapted to roll a bowling ball thereon, and including an approach end, a pin deck end, and opposite sides; said method comprising the steps of:
   forming a single, continuous polymer sheet having a thickness of between about 0.63 and 2.50 mm, and a generally rectangular plan shape defined by a leading end, a trailing end, a central portion extending between the leading and trailing ends, and opposite side edges;
   providing an attachment strip area on the lower face of the polymer sheet, which attachment strip area extends laterally across the width of the polymer sheet adjacent the leading end thereof;
   positioning the polymer sheet over the bowling lane such that the opposite side edges of the polymer sheet are disposed adjacent to the sides of the lane surface, the leading end of the polymer sheet is disposed adjacent to the approach end of the lane surface, and the trailing end of the polymer sheet is disposed adjacent to the pin deck end of the lane surface;

connecting the leading end of the polymer sheet with the lane surface by securely mounting the attachment strip area to the lane surface to prevent inadvertent lateral and longitudinal movement therebetween;

connecting the trailing end of the polymer sheet to the lane surface to prevent inadvertent lateral movement therebetween; and leaving the central portion of the polymer sheet unattached to the lane surface, so that the lane surface can shift both laterally and longitudinally without distorting the shape of the polymer sheet.

35. A method as set forth in claim 34, wherein:

said leading end connecting step comprises positioning a strip of double-sided adhesive tape between the lane surface and the attachment strip area on the polymer sheet, and applying pressure to the same to create a secure yet detachable connection which permits ready removal and replacement of the polymer sheet.

36. A method as set forth in claim 35, wherein:

said trailing end connecting step comprises connecting the corners of the trailing end to the lane surface.

37. A method as set forth in claim 36, wherein:

said polymer sheet forming step comprises selecting the polymer sheet from a material that is relatively stiff when flat.

38. A method as set forth in claim 37, wherein:

said polymer sheet forming step further comprises selecting a polycarbonate material.

39. A method as set forth in claim 38, wherein:

said polymer sheet forming step further comprises selecting a lubricious polymeric material.

40. A method as set forth in claim 39, wherein:

said trailing end connecting step further comprises positioning the trailing end of the polymer sheet adjacent a rearwardmost edge of the lane surface, such that the polymer sheet completely covers the pin deck end of the lane surface.

41. A method as set forth in claim 40, wherein:

said trailing end connecting step further comprises positioning first and second pieces of double-sided adhesive tape between the lane surface and the lower surface of the polymer sheet adjacent the corners of the trailing end to create a secure yet detachable connection which permits ready removal and replacement of the polymer sheet.

42. A method as set forth in claim 41, including:

applying decorative indicia to the polymer sheet prior to connecting the polymer sheet to the lane surface.

43. A method as set forth in claim 42, including:

trimming the marginal edges of the polymer sheet after connecting the polymer sheet to the lane surface.

44. A method as set forth in claim 43, wherein:

said polymer sheet forming step further comprises extruding a flexible multiple layer sheet having a clear first layer containing a mixture of polycarbonate and a lubricious polymeric material, a second clear polycarbonate layer containing an ultraviolet responsive pigment or dye, and a clear polycarbonate third layer with indicia applied to the lower surface thereof.

45. A method as set forth in claim 44, wherein:

said polymer sheet forming step further comprises selecting a sheet with a flat lower surface along at least the central portion thereof, that is adapted to be retained on the lane surface at least in part by static electric forces.

46. A method as set forth in claim 34, wherein:

said trailing end connecting step comprises connecting the corners of the trailing end to the lane surface.

47. A method as set forth in claim 34, wherein:

said polymer sheet forming step comprises selecting the polymer sheet from a material that is relatively stiff when flat.

48. A method as set forth in claim 34, wherein:

said polymer sheet forming step comprises selecting a polycarbonate material.

49. A method as set forth in claim 34, wherein:

said polymer sheet forming step comprises selecting a lubricious polymeric material.

50. A method as set forth in claim 34, wherein:

said trailing end connecting step further comprises positioning the trailing end of the polymer sheet adjacent a rearwardmost edge of the lane surface, such that the polymer sheet completely covers the pin deck end of the lane surface.

51. A method as set forth in claim 34, wherein:

said trailing end connecting step comprises positioning first and second pieces of double-sided adhesive tape between the lane surface and the lower surface of the polymer sheet adjacent the corners of the trailing end to create a secure yet detachable connection which permits ready removal and replacement of the polymer sheet.

52. A method as set forth in claim 34, including:

applying decorative indicia to the polymer sheet prior to connecting the polymer sheet to the lane surface.

53. A method as set forth in claim 34, including:

trimming the marginal edges of the polymer sheet after connecting the polymer sheet to the lane surface.

54. A method as set forth in claim 34, wherein:

said polymer sheet forming step comprises extruding a flexible multiple layer sheet having a clear first layer containing a mixture of polycarbonate and a lubricious polymeric material, a second clear polycarbonate layer containing an ultraviolet responsive pigment or dye, and a clear polycarbonate third layer with indicia applied to the lower surface thereof.

55. A method as set forth in claim 31, wherein:

said polymer sheet forming step comprises selecting a sheet with a flat lower surface along at least the central portion thereof, that is adapted to be retained on the lane surface at least in part by static electric forces.

56. A method as set forth in claim 34, including:

applying decorative materials to the polymer sheet prior to said positioning step.

57. A method as set forth in claim 56, wherein:

said applying step includes forming the decorative materials at least in part using an ultraviolet responsive pigment or dye.

58. A method as set forth in claim 57, wherein:

said polymer sheet forming step includes forming a generally transparent first layer; and said applying step includes applying the decorative materials to a lower face of the transparent first layer.

59. A method as set forth in claim 58, wherein:

said applying step includes applying at least some advertising to the lower face of the transparent first layer.

60. A method as set forth in claim 34, including:

applying an ultraviolet responsive pigment or dye to the polymer sheet prior to said positioning step.

61. A method as set forth in claim 34, wherein:

said polymer sheet forming step includes forming a generally transparent first layer; and including applying decorative materials to a lower face of the transparent first layer prior to said positioning step.

62. A method as set forth in claim 34, including:

applying advertising materials to the polymer sheet prior to said positioning step.

* * * * *

UNITED STATES PATENT AND TRADEMARK OFFICE
CERTIFICATE OF CORRECTION

PATENT NO.    : 6,450,892 B1
DATED         : September 17, 2002
INVENTOR(S)   : Roy A. Burkholder et al.

It is certified that error appears in the above-identified patent and that said Letters Patent is hereby corrected as shown below:

Column 1,
Line 42, "later" should be -- latter --.

Column 9,
Line 11, "a" should be -- an --.

Column 12,
Line 44, "claim 31" should be -- claim 34 --.

Signed and Sealed this

First Day of April, 2003

JAMES E. ROGAN
*Director of the United States Patent and Trademark Office*